(12) United States Patent
Wang et al.

(10) Patent No.: US 10,281,810 B2
(45) Date of Patent: *May 7, 2019

(54) PROJECTION APPARATUS COMPRISING PHOSPHOR WHEEL COATED WITH PHOSPHOR AGENTS FOR CONVERTING WAVEBAND LIGHT

(71) Applicant: DELTA ELECTRONICS, INC., Taoyuan Hsien (TW)

(72) Inventors: Bor Wang, Taouyan Hsien (TW); Keh-Su Chang, Taoyuan Hsien (TW); Chien-Hao Hua, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,202

(22) Filed: Nov. 17, 2017

(65) Prior Publication Data

US 2018/0074389 A1 Mar. 15, 2018

Related U.S. Application Data

(63) Continuation of application No. 15/403,995, filed on Jan. 11, 2017, which is a continuation-in-part of
(Continued)

(51) Int. Cl.
*F21V 9/08* (2018.01)
*G03B 21/20* (2006.01)
(Continued)

(52) U.S. Cl.
CPC ............. *G03B 21/204* (2013.01); *B32B 7/04* (2013.01); *B32B 9/005* (2013.01); *B32B 9/007* (2013.01);
(Continued)

(58) Field of Classification Search
CPC ......... G03B 21/204; G03B 33/06; F21K 9/64; F21V 9/08; H04N 9/3105; H04N 9/3114; H04N 9/3158; H04N 9/3164
(Continued)

(56) References Cited

U.S. PATENT DOCUMENTS 3,999,062 A 12/1976 Demsky et al.
5,998,925 A 12/1999 Shimizu et al.
(Continued)

FOREIGN PATENT DOCUMENTS

CN 1547266 A 11/2004
CN 1837893 A 9/2006
(Continued)

OTHER PUBLICATIONS

European Search Report, European Patent Application No. 17202283; dated Mar. 19, 2018.

*Primary Examiner* — Que Tan Le
(74) *Attorney, Agent, or Firm* — Kirton McConkie; Evan R. Witt

(57) ABSTRACT

A phosphor device of an illumination system emitting a first waveband light and having an optical path includes a first section and a first phosphor agent. The first phosphor agent is coated on the first section. The first waveband light is received and converted into a second waveband light by the first phosphor agent. The second waveband light is directed to the optical path. The range of the spectrum of the second waveband light includes at least a first color light and a second color light, so that the first color light or the second color light is separated from the second waveband light along the optical path. Therefore, the diversity of the design of the phosphor device is enhanced, the manufacturing cost and the size of product are reduced, and the color purity is enhanced.

10 Claims, 18 Drawing Sheets

Related U.S. Application Data application No. 14/979,128, filed on Dec. 22, 2015, now Pat. No. 9,726,335, which is a continuation-in-part of application No. 14/478,579, filed on Sep. 5, 2014, now Pat. No. 9,274,407, which is a continuation of application No. 13/617,201, filed on Sep. 14, 2012, now Pat. No. 9,024,241.

(60) Provisional application No. 62/324,752, filed on Apr. 19, 2016, provisional application No. 61/537,687, filed on Sep. 22, 2011.

(51) Int. Cl.
| | |
|---|---|
| *H04N 9/31* | (2006.01) |
| *F21V 9/30* | (2018.01) |
| *G03B 33/06* | (2006.01) |
| *B32B 7/04* | (2019.01) |
| *B32B 9/00* | (2006.01) |
| *B32B 9/04* | (2006.01) |
| *B32B 15/04* | (2006.01) |
| *B32B 15/20* | (2006.01) |
| *B32B 17/00* | (2006.01) |

(52) U.S. Cl.
CPC .............. *B32B 9/041* (2013.01); *B32B 15/04* (2013.01); *B32B 15/20* (2013.01); *B32B 17/00* (2013.01); *F21V 9/30* (2018.02); *G03B 33/06* (2013.01); *H04N 9/3105* (2013.01); *H04N 9/3114* (2013.01); *H04N 9/3158* (2013.01); *H04N 9/3161* (2013.01); *H04N 9/3164* (2013.01); *B32B 2250/02* (2013.01); *B32B 2255/06* (2013.01); *B32B 2307/204* (2013.01); *B32B 2307/302* (2013.01); *B32B 2307/40* (2013.01); *B32B 2307/412* (2013.01); *B32B 2307/416* (2013.01); *B32B 2307/422* (2013.01); *B32B 2457/00* (2013.01)

(58) Field of Classification Search
USPC ...................................... 250/226, 216, 208.1
See application file for complete search history.

(56) References Cited

U.S. PATENT DOCUMENTS

| | | | |
|---|---|---|---|
| 6,294,800 B1 | 9/2001 | Duggal et al. | |
| 6,467,910 B1 * | 10/2002 | Sato | H04N 9/3114 348/743 |
| 6,685,852 B2 | 2/2004 | Setlur et al. | |
| 6,884,671 B2 | 4/2005 | Jenq | |
| 7,547,114 B2 | 6/2009 | Li et al. | |
| 7,654,681 B2 | 2/2010 | Kim et al. | |
| 7,737,621 B2 | 6/2010 | Masuda et al. | |
| 7,863,635 B2 | 1/2011 | Andrews et al. | |
| 7,906,892 B2 | 3/2011 | Choi et al. | |
| 8,173,974 B2 | 5/2012 | Zheng et al. | |
| 8,556,437 B2 | 10/2013 | Miyake | |
| 8,562,141 B2 | 10/2013 | Ogino | |
| 8,662,678 B2 | 3/2014 | Hirata et al. | |
| 8,733,940 B2 | 5/2014 | Tanaka et al. | |
| 9,175,830 B2 | 11/2015 | Yang et al. | |
| 2005/0184298 A1 | 8/2005 | Ueda | |
| 2005/0206301 A1 | 9/2005 | Ng | |
| 2005/0270775 A1 | 12/2005 | Harbers et al. | |
| 2006/0226759 A1 | 10/2006 | Masuda et al. | |
| 2008/0211386 A1 | 9/2008 | Choi et al. | |
| 2009/0034284 A1 | 2/2009 | Li et al. | |
| 2009/0039375 A1 | 2/2009 | LeToquin et al. | |
| 2009/0051884 A1 | 2/2009 | Kuan et al. | |
| 2010/0213821 A1 | 8/2010 | Masuda et al. | |
| 2010/0220298 A1 | 9/2010 | Wang et al. | |
| 2010/0264448 A1 | 10/2010 | Choi et al. | |
| 2010/0314650 A1 | 12/2010 | Sugimori | |
| 2010/0315320 A1 | 12/2010 | Yoshida | |
| 2010/0328626 A1 | 12/2010 | Miyazaki | |
| 2011/0018026 A1 | 1/2011 | Konno et al. | |
| 2011/0043761 A1 | 2/2011 | Miyamae | |
| 2011/0051095 A1 | 3/2011 | Narimatsu et al. | |
| 2011/0057118 A1 | 3/2011 | Zheng et al. | |
| 2011/0063581 A1 | 3/2011 | Iwanaga | |
| 2011/0089456 A1 | 4/2011 | Andrews et al. | |
| 2011/0149549 A1 | 6/2011 | Miyake | |
| 2011/0188010 A1 | 8/2011 | Lin et al. | |
| 2011/0199580 A1 | 8/2011 | Hirata et al. | |
| 2011/0205502 A1 | 8/2011 | Kato et al. | |
| 2011/0227477 A1 | 9/2011 | Zhang et al. | |
| 2011/0228232 A1 | 9/2011 | Sakata et al. | |
| 2011/0228514 A1 | 9/2011 | Tong et al. | |
| 2011/0248296 A1 | 10/2011 | Choi et al. | |
| 2011/0261326 A1 | 10/2011 | Wang et al. | |
| 2011/0310353 A1 | 12/2011 | Maeda | |
| 2011/0310362 A1 | 12/2011 | Komatsu | |
| 2012/0039065 A1 | 2/2012 | Sun et al. | |
| 2012/0062857 A1 | 3/2012 | Saitou et al. | |
| 2012/0267998 A1 | 10/2012 | Sohn et al. | |
| 2013/0050654 A1 | 2/2013 | Hu et al. | |
| 2013/0113365 A1 | 5/2013 | Yamasuge et al. | |
| 2013/0228812 A1 | 9/2013 | Annen et al. | |
| 2013/0234591 A1 | 9/2013 | Hattori et al. | |
| 2014/0146293 A1 | 5/2014 | Hirata et al. | |
| 2015/0098070 A1 | 4/2015 | Hsieh et al. | |
| 2015/0184066 A1 | 7/2015 | Kwon et al. | |

FOREIGN PATENT DOCUMENTS

| | | |
|---|---|---|
| CN | 1929155 A | 3/2007 |
| CN | 101212015 A | 7/2008 |
| CN | 101562227 A | 10/2009 |
| CN | 101650311 A | 2/2010 |
| CN | 201717287 U | 1/2011 |
| CN | 101995748 A | 3/2011 |
| CN | 102073115 A | 5/2011 |
| CN | 102155639 A | 8/2011 |
| CN | 202109406 U | 1/2012 |
| CN | 102650811 A | 8/2012 |
| EP | 2271120 A1 | 1/2011 |
| EP | 2 339 655 A2 | 6/2011 |
| EP | 2 355 524 A1 | 8/2011 |
| EP | 2 360 523 A1 | 8/2011 |
| EP | 2 749 943 A1 | 7/2014 |
| JP | 2003295319 A | 10/2003 |
| JP | 2004325874 A | 11/2004 |
| JP | 2007156270 A | 6/2007 |
| JP | 2008124504 A | 5/2008 |
| JP | 2009245712 A | 10/2009 |
| JP | 2009277516 A | 11/2009 |
| JP | 2010515096 A | 5/2010 |
| JP | 2011048139 A | 3/2011 |
| JP | 2011071404 A | 4/2011 |
| JP | 2011100163 A | 5/2011 |
| JP | 2011128522 A | 6/2011 |
| JP | 2011165555 A | 8/2011 |
| JP | 2011168627 A | 9/2011 |
| JP | 2011175000 A | 9/2011 |
| JP | 2011197212 A | 10/2011 |
| JP | 2012137744 A | 7/2012 |
| JP | 2012203366 A | 10/2012 |
| JP | 5459537 B2 | 4/2014 |
| TW | 200912475 A | 3/2009 |
| TW | 201000617 A | 1/2010 |
| TW | 201251136 A | 12/2012 |
| TW | 201418414 A | 5/2014 |
| WO | 2012/135744 A2 | 10/2012 |
| WO | 2013/029463 A1 | 3/2013 |

* cited by examiner

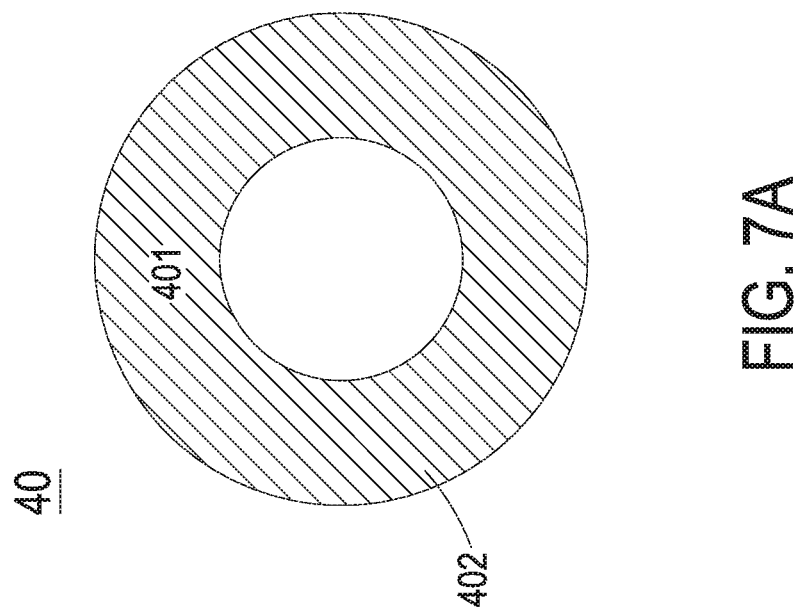

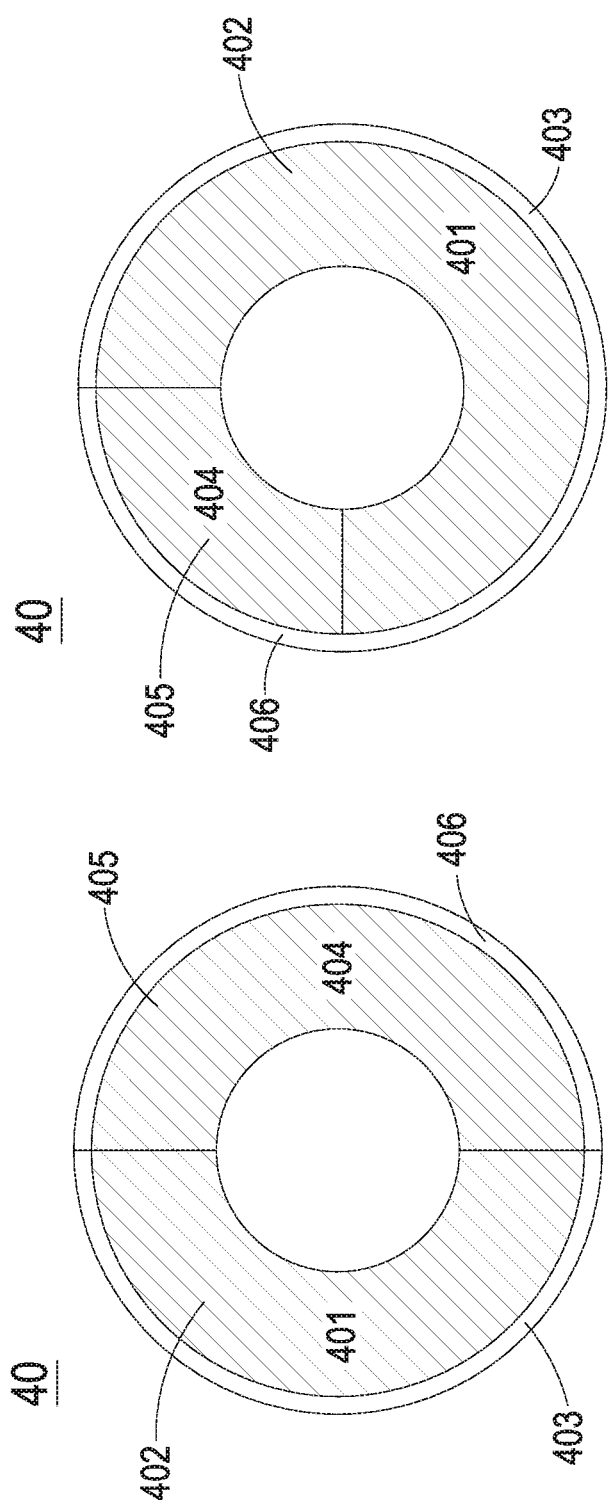

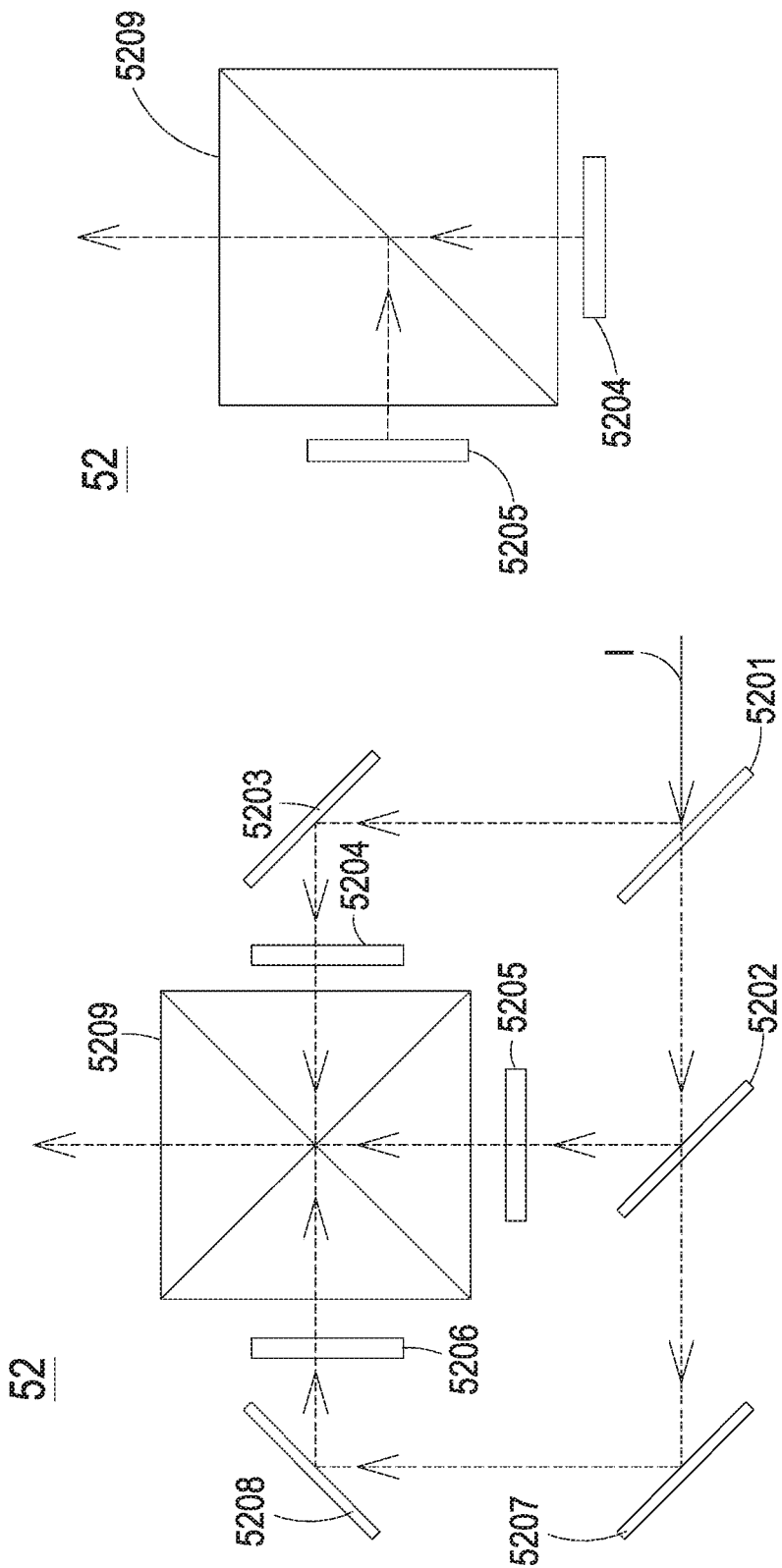

PROJECTION APPARATUS COMPRISING PHOSPHOR WHEEL COATED WITH PHOSPHOR AGENTS FOR CONVERTING WAVEBAND LIGHT

CROSS-REFERENCE TO RELATED APPLICATION

This application is a continuation application of U.S. application Ser. No. 15/403,995 filed on Jan. 11, 2017, which claims the benefit of U.S. Provisional Application Ser. No. 62/324,752 filed on Apr. 19, 2016 and is a continuation-in-part application of U.S. application Ser. No. 14/979,128 filed on Dec. 22, 2015, which is a continuation-in-part application of U.S. application Ser. No. 14/478,579 filed on Sep. 5, 2014, which is a continuation application of U.S. application Ser. No. 13/617,201 filed on Sep. 14, 2012 that claims the benefit of U.S. Provisional Application Ser. No. 61/537,687 filed on Sep. 22, 2011. Each of the aforementioned patent applications is incorporated herein by reference.

FIELD OF THE INVENTION

The present invention relates to a phosphor device, and more particularly to a phosphor device applied to an illumination system.

BACKGROUND OF THE INVENTION

In recent years, a variety of projectors have been widely used in various video applications. For example, projectors can be used for making presentations, holding meetings or giving lectures in classrooms, boardrooms, conference rooms or home theaters. By the projector, an image signal from an image signal source can be enlarged and shown on a display screen. For reducing power consumption and overall volume, the illumination system of the current projector employs a solid-state light-emitting element (e.g. light emitting diode or laser diode) to replace the conventional high intensity discharge (HID) lamp.

Generally, the illumination system of the projector may emit three primary color lights, i.e. red light (R), green light (G) and blue light (B). Among three primary color solid-state light-emitting elements including a red solid-state light-emitting element, a green solid-state light-emitting element and a blue solid-state light-emitting element, the blue solid-state light-emitting element has the highest luminous efficiency. Since the red solid-state light-emitting element and the green solid-state light-emitting element have poor luminous efficiency, the red light or the green light may be produced by using a blue solid-state light-emitting element and a wavelength conversion device (e.g. a phosphor wheel). That is, the uses of the blue solid-state light-emitting element and the phosphor wheel may directly emit the red light or the green light in replace of the red solid-state light-emitting element or the green solid-state light-emitting element. Consequently, the luminous efficiency of the whole illumination system is enhanced and the manufacturing cost of the illumination system is reduced.

Generally, the conventional illumination systems of the projectors are classified into two types. A conventional illumination system utilizes a single blue solid-state light-emitting element and a single phosphor wheel with plural sections. FIG. 1A schematically illustrates the architecture of a conventional projector. FIG. 1B schematically illustrates a phosphor wheel used in the illumination system of the projector as shown in FIG. 1A. As shown in FIGS. 1A and 1B, the illumination system of the projector 1 employs a solid-state light-emitting element 11 to emit blue light to a phosphor wheel 12 with a first section 121, a second section 122 and a third section 123. The first section 121 is coated with a green phosphor agent. By the green phosphor agent, the incident blue light is converted to green light. The second section 122 is coated with a red phosphor agent. By the red phosphor agent, the incident blue light is converted to red light. The third section 123 is a transparent section. The blue light is transmitted through the third section 123. In other words, the blue light from the solid-state light-emitting element 11 is directly transmitted through the phosphor wheel 12 or converted into the green light or the red light by the phosphor wheel 12. Consequently, three primary color lights can be produced. Moreover, the three primary color lights are directed to an imaging device 14 through a relay module 13. For example, the imaging device 14 is a digital micromirror device (DMD), a liquid crystal display (LCD) device or a liquid crystal on silicon (LCOS) device. After being scaled up/down and focused by a lens group 15, an image is projected on a display screen 16.

Another conventional illumination system utilizes three blue solid-state light-emitting elements and two phosphor wheels, wherein each of the two phosphor wheels is coated with a single color phosphor agent. FIG. 2A schematically illustrates the architecture of another conventional projector. FIG. 2B schematically illustrates a first phosphor wheel used in the illumination system of the projector as shown in FIG. 2A. FIG. 2C schematically illustrates a second phosphor wheel used in the illumination system of the projector as shown in FIG. 2A. Please refer to FIGS. 2A, 2B and 2C. In the conventional illumination system of the projector 2, a section 221 of a first phosphor wheel 22 is coated with a red phosphor agent, and a section 241 of a second phosphor wheel 24 is coated with a green phosphor agent. By the red phosphor agent, the incident blue light is converted to red light. By the green phosphor agent, the incident blue light is converted to green light.

The projector 2 further comprises a first dichroic mirror 210 and a second dichroic mirror 211, a first solid-state light-emitting element 21, a second solid-state light-emitting element 23, and a third solid-state light-emitting element 25. The red light is permitted to be transmitted through the first dichroic mirror 210, but the green light is reflected by the first dichroic mirror 210. The red light and the green light are permitted to be transmitted through the second dichroic mirror 211, but the blue light is reflected by the second dichroic mirror 211. The blue light from the first solid-state light-emitting element 21 is converted to red light by the first phosphor wheel 22. The red light is transmitted through the first dichroic mirror 210 and the second dichroic mirror 211 and directed to a relay module 26. The blue light from the second solid-state light-emitting element 23 is converted to green light by the second phosphor wheel 24. The green light is sequentially reflected by the first dichroic mirror 210, transmitted through the second dichroic mirror 211 and directed to the relay module 26. The blue light from the third solid-state light-emitting element 25 is reflected by the second dichroic mirror 211 and directed to the relay module 26. Moreover, the three primary color lights are sequentially or simultaneously directed to an imaging device 27 through the relay module 26. After being scaled up/down and focused by a lens group 28, an image is projected on a display screen 29.

From the above discussions, the uses of the blue solid-state light-emitting element and the phosphor wheel may directly emit the red light or the green light in replace of the red solid-state light-emitting element or the green solid-state light-emitting element. However, since the green light converted by the green phosphor agent contains a portion of red light, the green light looks somewhat yellowish. That is, the color purity is insufficient, and thus the imaging quality is impaired. Moreover, the exciting efficiency of red phosphor is lower and easier saturated than the green phosphor, the total amount of red light converted from the red phosphor agent is insufficient. As the driving current of the blue solid-state light-emitting element increases, the red light converted by the red phosphor agent quickly saturates or even decay. Under this circumstance, the luminance and brightness of the red light is too low, and the bright/dark status of the illumination system fails to be effectively controlled. Consequently, the overall amount of the output light is limited.

In addition, in a reflective phosphor wheel, the reflectivity and the reflection spectrum of which are the key to decide the capability of the phosphor wheel. The general reflective coatings are usually made of silver or aluminum for covering all the range of the visible light. Please refer to FIG. 3. FIG. 3 schematically illustrates the reflectivity of silver and aluminum corresponding to visible light with wavelength between 400 and 700 nanometers and the phosphor spectra of green light, yellow light and red light. Since the chemical stability of silver is relative lower, the gathering and sulfation phenomena of silver atom are occurred when the power of Laser or the operation temperature is high, and further the reflectivity is significantly decreased. Under this circumstance, a phosphor wheel applied under high energy usually utilizes aluminum as the reflective coating. Although aluminum is relative more stable, the reflectivity of itself is lower, especially lowest at the red light waveband with wavelength between 600 and 700 nanometers. As a result, a phosphor wheel utilizing aluminum as the reflective coating has the issue of insufficient output of red light causing the decreasing of output efficiency. In brief, no matter using silver or aluminum as the reflective coating, the performance of reflectivity is not actually well.

Therefore, there is a need of providing an improved phosphor device that provides max outputs of each waveband in order to eliminate the above drawbacks.

SUMMARY OF THE INVENTION

It is an object of the present invention to provide a phosphor device for overcoming at least one of the above-mentioned drawbacks encountered by the prior arts.

The present invention provides a phosphor device. By utilizing the first phosphor agent to convert the first waveband light into a second waveband light with a wider waveband to the optical path, and separate the second waveband light along the optical path to select the first color light or the second color light for meeting the practical demands, the diversity of the design of the phosphor device is enhanced, the manufacturing cost and the size of product are reduced, and the color purity is enhanced.

The present invention also provides a phosphor device. Since the reflective substrate has at least two reflective spectra, the reflective spectrum corresponded to a specified color light can be specified for providing the phosphor device has a reflectivity corresponded to all waveband greater than the reflectivity corresponded to all waveband of aluminum, and further the max outputs of each waveband are provided.

In accordance with an aspect of the present invention, there is provided a phosphor device of an illumination system. The illumination system emits a first waveband light and has an optical path. The phosphor device includes a first section and a first phosphor agent. The first phosphor agent is coated on the first section. After the first waveband light is received by the first phosphor agent, the first waveband light is converted into a second waveband light, and the second waveband light is directed to the optical path. The range of the spectrum of the second waveband light includes at least a first color light and a second color light, so that the first color light or the second color light is separated from the second waveband light along the optical path.

In accordance with another aspect of the present invention, there is provided a phosphor device of an illumination system. The illumination system emits a first waveband light and a second waveband light and has an optical path. The phosphor device includes a first section, a first phosphor agent and a dichroic element. The first section has a dielectric film layer. The first phosphor agent is coated on the first section. The first phosphor agent is a yellow phosphor agent, a green phosphor agent or a yellow-green phosphor agent, the first waveband light is received and converted into a third waveband light by the first phosphor agent, and the third waveband light is directed to the optical path. The range of the spectrum of the third waveband light includes green light and red light, so that the third waveband light is separated into at least two color lights along the optical path. One of the at least two color lights is red light. The dielectric film layer has a reflective spectrum corresponded to the range of the spectrum of red light. The dichroic element is disposed on a front end of the optical path. The second waveband light is reflected by the dichroic element and the third waveband light is transmitted through the dichroic element, or the third waveband light is reflected by the dichroic element and the second waveband light is transmitted through the dichroic element.

In accordance with a further aspect of the present invention, there is provided a phosphor device of an illumination system. The illumination system emits a first waveband light and has an optical path. The phosphor device includes a reflective substrate and a first phosphor layer. The reflective substrate includes a first section. The first phosphor layer includes a first phosphor agent and a fourth phosphor agent. The first phosphor agent is formed on the first section. The first waveband light is converted into a second waveband light so as to be directed to the optical path by the first phosphor agent. The range of the spectrum of the second waveband light comprises at least a first color light and a second color light, so that the second color light is separated from the second waveband light along the optical path. The fourth phosphor agent is distributed over the first phosphor agent for converting the first waveband light into the second color light so as to increase the luminous intensity of the second color light.

In accordance with a further aspect of the present invention, there is provided a phosphor device of an illumination system. The illumination system emits a first waveband light and has an optical path. The phosphor device includes a reflective substrate, a first phosphor agent and a second phosphor agent. The reflective substrate includes a first section, a second section and a third section. The first section has a reflective spectrum with a reflectivity corresponded to a first color light greater than the reflectivity corresponded to the first color light of aluminum, the second section has a reflective spectrum with a reflectivity corresponded to a second color light greater than the reflectivity corresponded to the second color light of aluminum, and the third section directly reflects the first waveband light. The first phosphor agent is coated on the first section for converting the first waveband light into a second waveband light. The range of the spectrum of the second waveband light at least includes the first color light. The second phosphor agent is coated on the second section for converting the first waveband light into a third waveband light. The range of the spectrum of the third waveband light at least includes the second color light.

In accordance with a further aspect of the present invention, there is provided a phosphor device of an illumination system. The illumination system emits a first waveband light and has an optical path. The phosphor device includes a reflective substrate, a first phosphor agent and a second phosphor agent. The reflective substrate includes a first section and a second section. The first phosphor agent is coated on the first section for converting the first waveband light into a second waveband light. The range of the spectrum of the second waveband light at least includes a first color light. The second phosphor agent is coated on the second section for converting the first waveband light into a third waveband light. The range of the spectrum of the third waveband light at least includes a second color light. The range of the spectrum of the second waveband light is at least partially overlapped with the range of the spectrum of the third waveband light.

In accordance with a further aspect of the present invention, there is provided a phosphor device of an illumination system. The illumination system emits a first waveband light and has an optical path. The phosphor device includes a reflective substrate, a first phosphor agent and a second phosphor agent. The reflective substrate includes a first section and a second section. The first phosphor agent is coated on the first section. The second phosphor agent is coated on the second section. The first phosphor agent and the second phosphor agent are yellow phosphor agents, green phosphor agents or yellow-green phosphor agents. The first phosphor agent and the second phosphor agent receive the first waveband light and respectively convert the first waveband light into second waveband lights. The ranges of the spectrum of the second waveband lights are at least partially overlapped and include green light and red light. The first phosphor agent and the second phosphor agent have different compositions so as to respectively convert the first waveband light into two kinds of the second waveband lights. The second waveband lights are sequentially entered the optical path and are separated into at least two color lights, and one of the at least two color lights is red light.

The above contents of the present invention will become more readily apparent to those ordinarily skilled in the art after reviewing the following detailed description and accompanying drawings, in which:

BRIEF DESCRIPTION OF THE DRAWINGS

FIG. 7A is a phosphor device used in the projection apparatus of FIG. 6A or FIG. 6B;

FIG. 7B is another exemplary phosphor device used in the projection apparatus of FIG. 6A or FIG. 6B;

FIG. 7C is a further exemplary phosphor device used in the projection apparatus of FIG. 6A or FIG. 6B;

FIG. 8A schematically illustrates an exemplary imaging module used in the projection apparatus of the present invention;

FIG. 8B schematically illustrates another exemplary imaging module used in the projection apparatus of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1B:
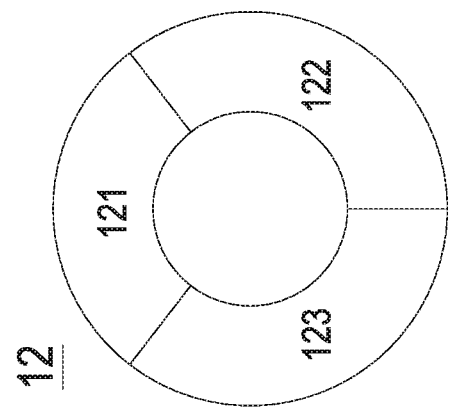
FIG. 1B schematically illustrates a phosphor wheel used in the illumination system of the projector as shown in FIG. 1A.
Figure 1A:
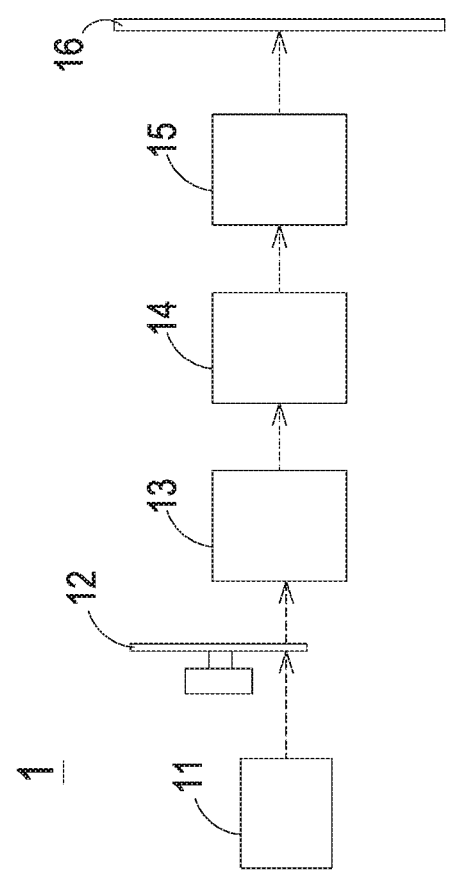
FIG. 1A schematically illustrates the architecture of a conventional projector.
Figure 2A:
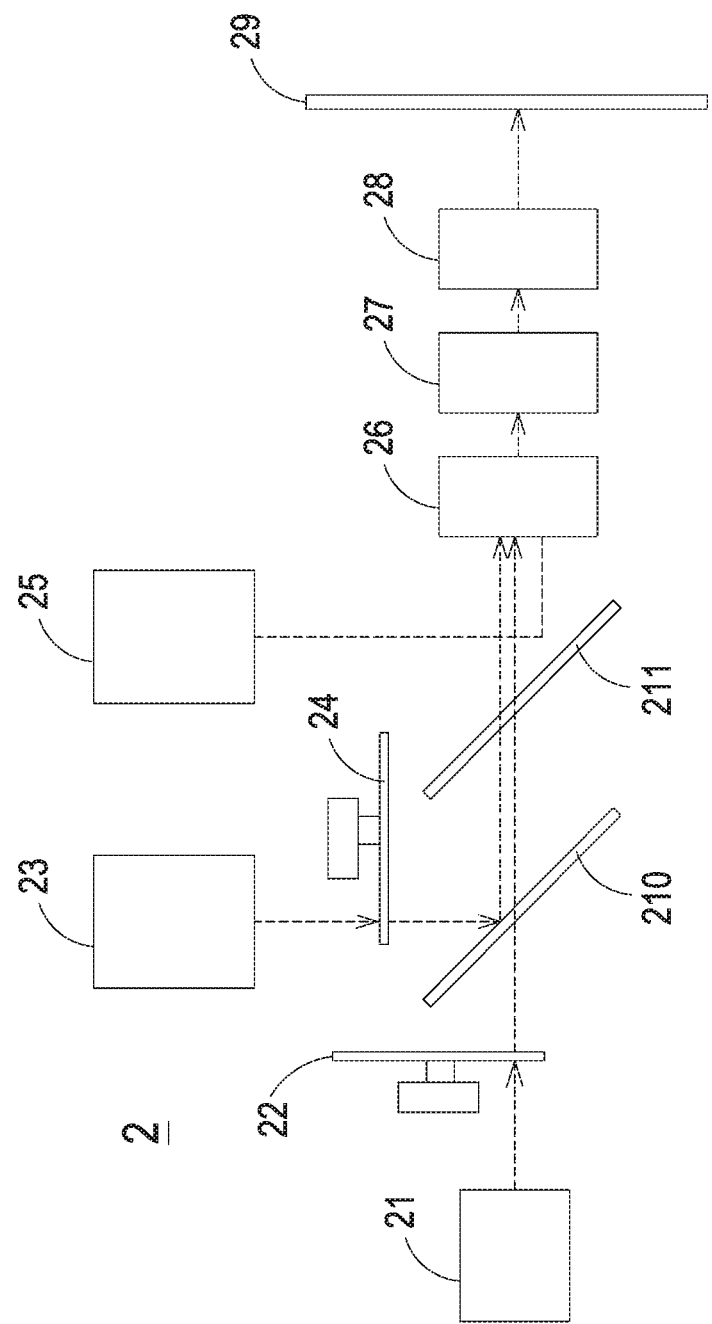
FIG. 2A schematically illustrates the architecture of another conventional illumination system of a projector.
Figure 2C:
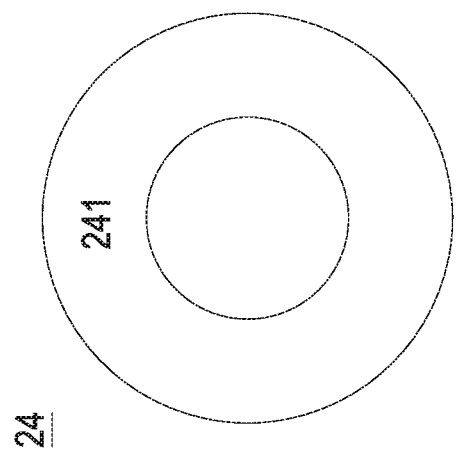
FIG. 2C schematically illustrates a second phosphor wheel used in the conventional illumination system as shown in FIG. 2A.
Figure 2B:
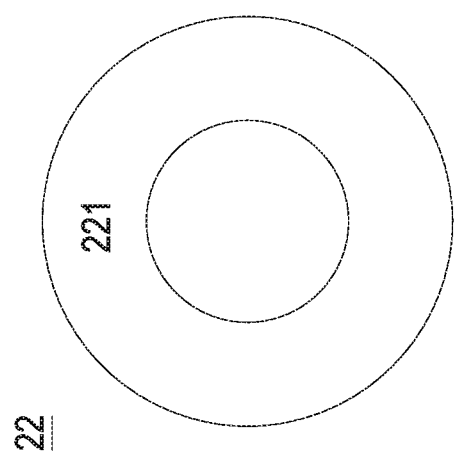
FIG. 2B schematically illustrates a first phosphor wheel used in the conventional illumination system as shown in FIG. 2A.
Figure 3:
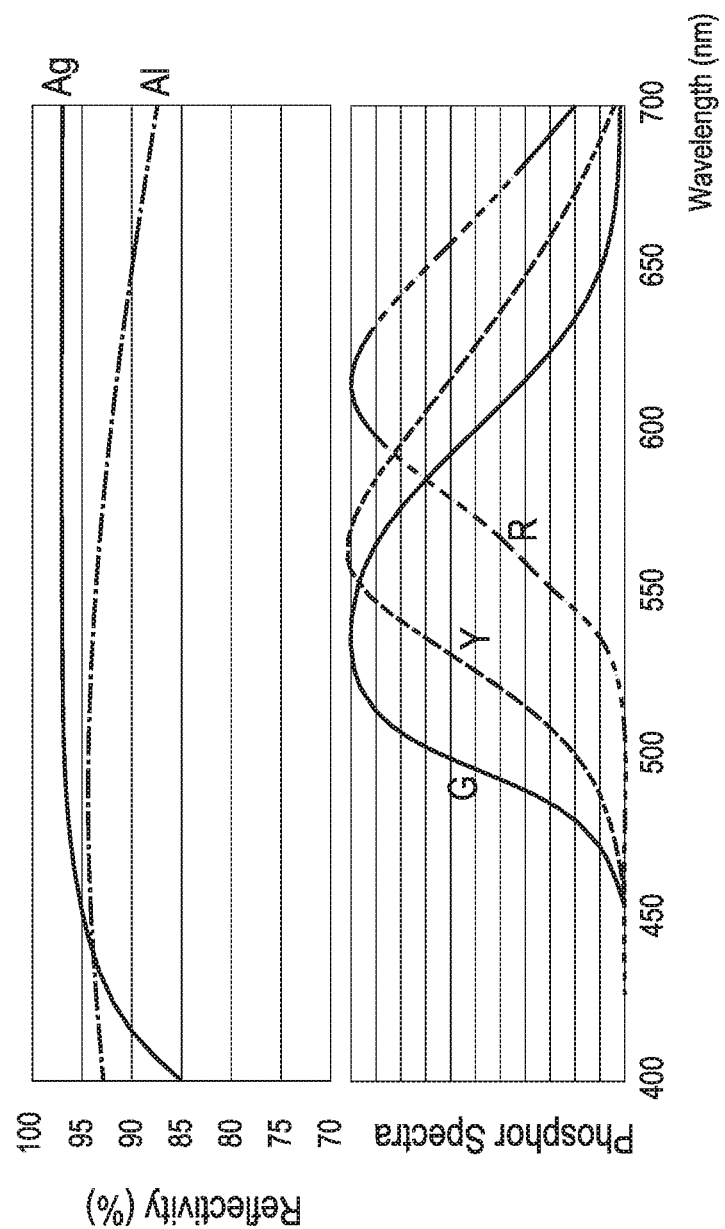
FIG. 3 schematically illustrates the reflectivity of silver and aluminum corresponding to visible light with wavelength between 400 and 700 nanometers and the phosphor spectra of green light, yellow light and red light.
Figure 4:
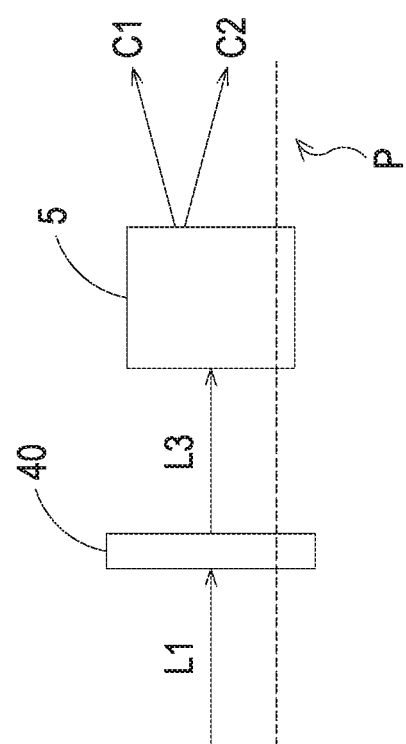
FIG. 4 schematically illustrates the concept of a projection apparatus with a phosphor device according to an embodiment of the present invention.

FIG. 4 schematically illustrates the concept of a projection apparatus with a phosphor device according to an embodiment of the present invention. As shown in FIG. 4, the phosphor device 40 is used in an illuminating system that emits a first waveband light L1 and has an optical path P. The phosphor device 40 includes a first section 401 and a first phosphor agent 402 (see FIG. 7A). The first section 401 is coated with the first phosphor agent 402. After the first waveband light L1 from the illuminating system is received by the first phosphor agent 402, the first waveband light L1 is converted into a third waveband light L3, and the third waveband light L3 is directed to an image processing device 5 along the optical path P. By the image processing device 5, a color separation process is performed to separate the third waveband light L3 into a first color light C1 and a second color light C2.

In some embodiments, the image processing device 5 is preferred to include a dichroic element, simultaneously the dichroic element can be selected to meet the practical demands in order to obtain only the first color light C1 or the second color light C2. Therefore, the diversity of the design of the phosphor device is enhanced, the manufacturing cost and the size of product are reduced, and the color purity is enhanced.

In some embodiments, the range of the spectrum of the third waveband light L3 at least includes the first color light C1, and the range of the spectrum of the third waveband light L3 at least includes the second color light C2.

Figure 5B:
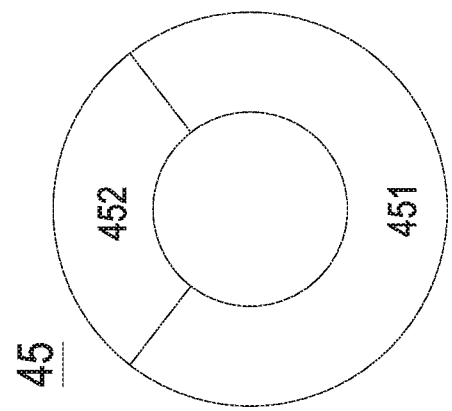
FIG. 5B schematically illustrates the structure of the phosphor device of FIG. 5A.
Figure 5A:
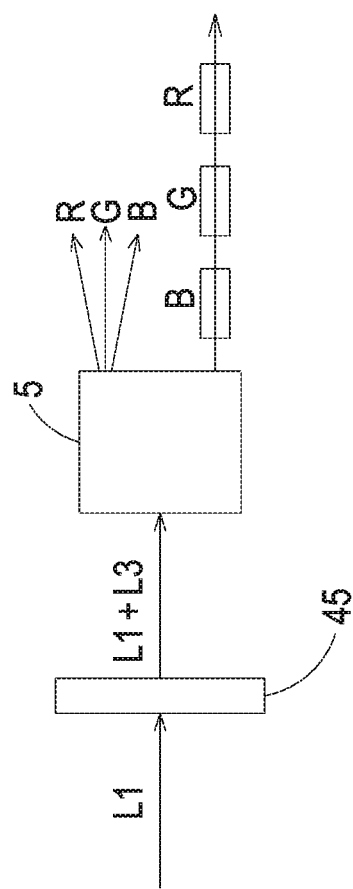
FIG. 5A schematically illustrates the concept of a projection apparatus with a phosphor device according to another embodiment of the present invention.

FIG. 5A schematically illustrates the concept of a projection apparatus with a phosphor device according to another embodiment of the present invention. FIG. 5B schematically illustrates the structure of the phosphor device of FIG. 5A. Please refer to FIGS. 4, 5A and 5B. The phosphor device 45 includes a first section 451 and a transparent section 452. The central angle of the transparent section 452 is smaller than the central angle of the first section 451. In addition, the first section 451 is coated with a first phosphor agent. For clarification, the first phosphor agent is not shown in the drawings. A portion of the first waveband light L1 from the illuminating system is partially transmitted through the transparent section 452 of the phosphor device 45 and directed to an image processing device 5 along the optical path. Another portion of the first waveband light L1 is received by the first phosphor agent of the phosphor device 45, and converted into a third waveband light L3. The third waveband light L3 is also directed to the image processing device 5 along the optical path. By the image processing device 5, a color separation process is performed to separate the first waveband light L1 and the third waveband light L3 into at least two color lights. The at least two color lights and the first waveband light L1 constitute three primary color lights. For example, if the first waveband light L1 is blue light, the at least two color lights include red light and green light. That is, the first waveband light L1 and the third waveband light L3 from the phosphor device 45 include the fractions of three primary color lights, which may be equivalent to a white light. By the image processing device 5, the first waveband light L1 and the third waveband light L3 are subject to color separation or time division, and thus the three primary color lights are projected in a color separation or time division manner.

In some embodiments, the first waveband light L1 is blue light or ultraviolet light, and the third waveband light L3 is yellow light, green light or yellow-green light. The wavelength of the third waveband light L3 is preferred to be 450-710 nanometers. The first color light is green light, and the second light is red light. The first phosphor agent on the first section 451 of the phosphor device 45 is a green phosphor agent, a yellow phosphor agent or a yellow-green phosphor agent. Consequently, the first waveband light L1 (i.e. the blue light) and the third waveband light L3 (i.e. the yellow light, the green light or the yellow-green light) are directed from the phosphor device 45 to the image processing device 5. Since the third waveband light L3 (i.e. the yellow light, the green light or the yellow-green light) covers the waveband of the green light and the red light, after the color separation process is performed on the third waveband light L3, the third waveband light L3 is separated into green light G and red light R. Consequently, the green light G, the red light R and the first waveband light L1 (i.e. the blue light) may be projected in the color separation or time division manner.

Figure 6A:
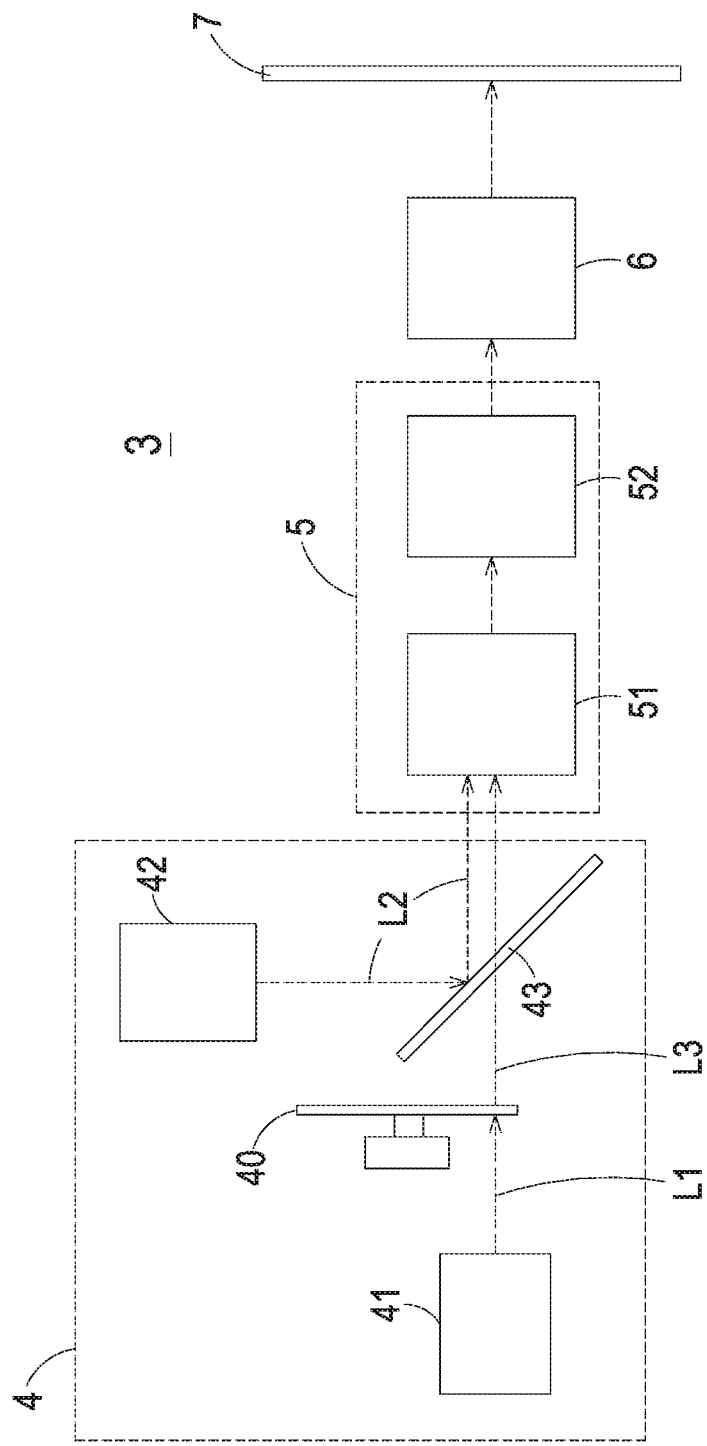
FIG. 6A schematically illustrates a projection apparatus according to an embodiment of the present invention.
Figure 6B:
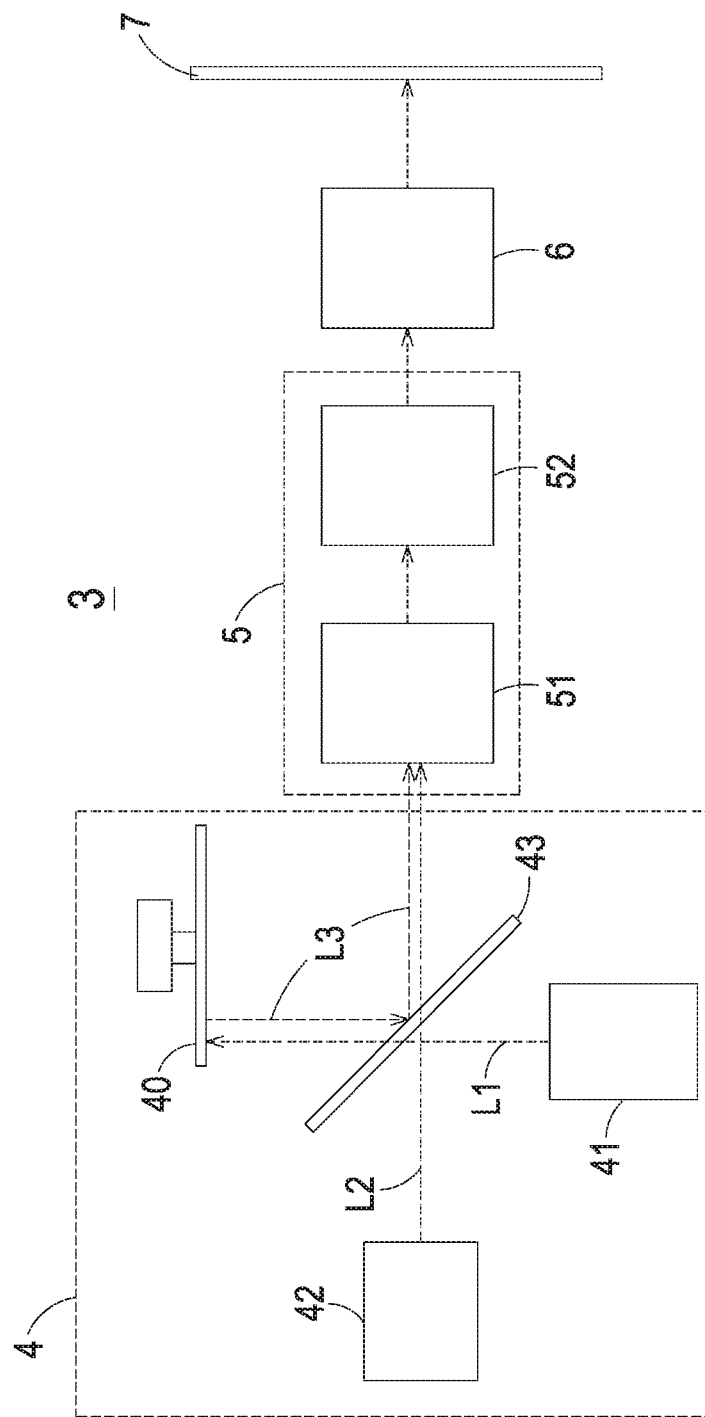
FIG. 6B schematically illustrates a projection apparatus according to another embodiment of the present invention.

FIG. 6A schematically illustrates a projection apparatus according to an embodiment of the present invention. FIG. 6B schematically illustrates a projection apparatus according to another embodiment of the present invention. FIG. 7A is a phosphor device used in the projection apparatus of FIG. 6A or FIG. 6B. Please refer to FIGS. 6A, 6B and 7A. The projection apparatus 3 includes an illuminating system 4, an image processing device 5, and a lens group 6. The illuminating system 4 includes a phosphor device 40, a first solid-state light-emitting element 41, and a second solid-state light-emitting element 42. The image processing device 5 and the lens group 6 are arranged along an optical path. Moreover, the image processing device 5 includes at least one color-separating element, and the lens group 6 includes at least one lens. The image processing device 5 includes a relay module 51 and an imaging module 52. Along the optical path, the relay module 51 is located upstream of the imaging module 52. After being scaled up/down and focused by the lens group 6, an image is projected on a display screen 7. Moreover, according to the practical requirements of the optical path, the relay module 51 may include a relay lens, a homogenizer or a reflective mirror (not shown).

An example of the phosphor device 40 includes but is not limited to a phosphor wheel or a phosphor plate. The phosphor device 40 has a first section 401 containing a first phosphor agent 402. The first phosphor agent 402 is coated on the first section 401. For example, the first phosphor agent 402 is a green phosphor agent, a yellow phosphor agent or a yellow-green phosphor agent. The first solid-state light-emitting element 41 is used for emitting a first waveband light L1 to the phosphor device 40. The second solid-state light-emitting element 42 is used for emitting a second waveband light L2 to the optical path. In an embodiment, the first solid-state light-emitting element 41 and the second solid-state light-emitting element 42 are blue solid-state light-emitting elements or blue laser diodes for emitting the blue light (e.g. the first waveband light L1). That is, the first waveband light L1 is light within the spectrum of a blue waveband. In some embodiments, the first waveband light L1 is ultraviolet light. The first waveband light L1 and the second waveband light L2 are lights within the same waveband or different wavebands. By the phosphor device 40, the first waveband light L1 from the first solid-state light-emitting element 41 is converted into a third waveband light L3. The third waveband light L3 is a yellow-green light which covers a green waveband and a red waveband. In a case that the first phosphor agent is a green phosphor agent, the third waveband light L3 is green light within a waveband between 450 nm and 710 nm. In the practical applications, the light within the waveband between 450 nm and 710 nm and the blue light are used in the rear end of the optical path to produce the three primary color lights.

From the above discussions, the first waveband light L1 within the blue waveband is converted into the third waveband light L3, which is a yellow-green light which covers a green waveband and a red waveband. The third waveband light L3 is directed to the optical path. A color separation process is performed to separate the third waveband light L3 into at least two color lights by the image processing device 5. Consequently, the at least two color lights and the second waveband light L2 are projected as an image in a color separation or time division manner. In other words, the phosphor device 40 issues the third waveband light L3 to the optical path. After the second waveband light L2 and the third waveband light L3 are received by the image processing device 5, the third waveband light L3 is separated into at least two color lights. Consequently, the primary color lights included in the second waveband light L2 and the third waveband light L3 are projected as an image in a color separation or time division manner. Since the illuminating system 4 only includes a single phosphor device 40, the overall volume of the illuminating system 4 or the projection apparatus 3 is reduced, the fabricating process is simplified, and the fabricating cost is reduced. Moreover, by using the illuminating system 4, the color purity and the imaging quality are enhanced. Moreover, since the first waveband light L1 is converted into the third waveband light L3 with a wider waveband. As the driving current of the blue solid-state light-emitting element increases, the possibility of attenuating the red light will be reduced. Consequently, the overall luminance and brightness of the projection apparatus 3 will be increased, and the color performance is enhanced.

Please refer to FIGS. 6A and 6B again. The illuminating system 4 further includes a dichroic element 43 (e.g. a dichroic mirror). The dichroic element 43 is arranged at the front end of the optical path for assisting in introducing the third waveband light L3 and the second waveband light L2 into the optical path. In such way, the phosphor device 40, the first solid-state light-emitting element 41 and the second solid-state light-emitting element 42 may be applied to a transmissive illumination system or a reflective illumination system.

The illumination system as shown in FIG. 6A is a transmissive illumination system. In this embodiment, the third waveband light L3 is permitted to be transmitted through the dichroic element 43, but the second waveband light L2 is reflected by the dichroic element 43. The phosphor device 40 and the first solid-state light-emitting element 41 are located at a first side of the dichroic element 43. In addition, the phosphor device 40 is located along the optical path, and arranged between the first solid-state light-emitting element 41 and the dichroic element 43. By the phosphor device 40, the first waveband light L1 from the first solid-state light-emitting element 41 is converted into the third waveband light L3. The third waveband light L3 is transmitted through the dichroic element 43 and directed to the image processing device 5 and the lens group 6 at the rear end of the optical path. Under this circumstance, the incident direction of the first waveband light L1 is identical to the emergence direction of the third waveband light L3. The second solid-state light-emitting element 42 is located at a second side of the dichroic element 43. The second solid-state light-emitting element 42 is used for emitting the second waveband light L2 to the dichroic element 43. The second waveband light L2 is reflected by the dichroic element 43 and directed to the image processing device 5 and the lens group 6 at the rear end of the optical path. It is noted that numerous modifications and alterations may be made while retaining the teachings of the invention. For example, the dichroic element 43 may be designed to allow the second waveband light L2 to be transmitted through but reflect the third waveband light L3. Under this circumstance, the second waveband light L2 and the third waveband light L3 are also directed to the image processing device 5 and the lens group 6 at the rear end of the optical path.

The illumination system as shown in FIG. 5B is a reflective illumination system. In this embodiment, the second waveband light L2 is permitted to be transmitted through the dichroic element 43, but the third waveband light L3 is reflected by the dichroic element 43. The first solid-state light-emitting element 41 and the second solid-state light-emitting element 42 are both located at a first side of the dichroic element 43. The phosphor device 40 is located at a second side of the dichroic element 43. The first waveband light L1 from the first solid-state light-emitting element 41 is directly transmitted through the dichroic element 43 and directed to the phosphor device 40. The second waveband light L2 from the second solid-state light-emitting element 42 is transmitted through the dichroic element 43 and directed to the image processing device 5 and the lens group 6 at the rear end of the optical path. Moreover, after the first waveband light L1 from the first solid-state light-emitting element 41 is received by the phosphor device 40, the first waveband light L1 is converted into the third waveband light L3. The third waveband light L3 is directed to the dichroic element 43 in a direction reverse to the first waveband light L1. In other words, the incident direction of the first waveband light L1 is reverse to the emergence direction of the third waveband light L3 with respect to the phosphor device 40. Then, the third waveband light L3 is reflected by the dichroic element 43 and directed to the image processing device 5 and the lens group 6 at the rear end of the optical path.

From the above discussions, the first waveband light L1 is converted into a third waveband light L3. In a case that the first phosphor agent is a green phosphor agent, a yellow phosphor agent or a yellow-green phosphor agent, the third waveband light L3 is a yellow-green light within a waveband between 450 nm and 710 nm. By the color-separating element of the image processing device 5, the third waveband light L3 within the waveband between 450 nm and 710 nm is separated into green light and red light. The green light, the red light and the second waveband light L2 (i.e. the blue light) are projected as an image in a color separation or time division manner. Moreover, since the green light is more sensitive to the human eyes than the red light, the phosphor device 40 of the illumination system 4 may be modified to have plural sections. Moreover, the additional use of the filter may adjust the luminance and brightness of the green light or the red light.

Additionally, the first section 401 is preferred to be configured as a reflective substrate. The first section 401 has a reflective spectrum with a reflectivity corresponded to the first color light C1 greater than the reflectivity corresponded to the first color light C1 of aluminum, or the first section 401 has a reflective spectrum with a reflectivity corresponded to the second color light C2 greater than the reflectivity corresponded to the second color light C2 of aluminum.

FIG. 7B is another exemplary phosphor device used in the projection apparatus of FIG. 6A or FIG. 6B. FIG. 7C is a further exemplary phosphor device used in the projection apparatus of FIG. 6A or FIG. 6B. Please refer to FIGS. 6A, 7B and 7C. In this embodiment, the phosphor device 40 includes a first section 401 containing a first phosphor agent 402 and a second section 404 containing a second phosphor agent 405. The first phosphor agent 402 is coated on the first section 401. The second phosphor agent 405 is coated on the second section 404. In some embodiments, the first phosphor agent 402 and the second phosphor agent 405 are green phosphor agents, yellow phosphor agents or yellow-green phosphor agents, but are not limited thereto. In addition, the compositions of the first phosphor agent 402 and the second phosphor agent 405 may be identical or different. In a case that the compositions of the first phosphor agent 402 and the second phosphor agent 405 are identical, the first waveband light L1 within the blue waveband is converted into the third waveband light L3, which covers a green waveband and a red waveband. In a case that the compositions of the first phosphor agent 402 and the second phosphor agent 405 are similar or different, the first waveband light L1 within the blue waveband is converted into two kinds of second waveband lights (not shown). The two kinds of second waveband lights are time-sequentially directed to the rear end of the illumination system 4.

In some other embodiments, the phosphor device 40 further includes a first color filter 403 and a second color filter 406. The first color filter 403 and the second color filter 406 are located at the side of the phosphor device 40 for outputting the third waveband light L3. In addition, the first color filter 403 and the second color filter 406 are located adjacent to the first section 401 and the second section 404, respectively. The first color filter 403 is used for filtering a first light of the third waveband light L3. Consequently, a second light of the third waveband light L3 is transmitted through the first color filter 403 and directed to the optical path. The second color filter 406 is used for filtering the second light of the third waveband light L3. Consequently, the first light of the third waveband light L3 is transmitted through the second color filter 406 and directed to the optical path.

For example, if the third waveband light L3 is yellow-green light or yellow light within a green waveband and a red waveband, the first light is green light and the second light is red light. The first color filter 403 is used for filtering the green light, so that the red light is transmitted through the first color filter 403 and directed to the optical path. Moreover, the second color filter 406 is used for filtering the red light, so that the green light is transmitted through the second color filter 406 and directed to the optical path. In other words, the first color filter 403 is a red filter, and the second color filter 406 is a green filter, but is not limited thereto. Moreover, in some embodiments, the first color filter 403 and the second color filter 406 may be exchanged in order to change the optical properties (e.g. the luminance or brightness) of the first light or the second light outputted from the phosphor device 40. Alternatively, in some other embodiments, the second section 404 is a transparent region, a light-transmissible region or a reflective region without any phosphor agent.

FIG. 8A schematically illustrates an exemplary imaging module used in the projection apparatus of the present invention. Please refer to FIGS. 6A and 8A. In this embodiment, the imaging module 52 of the image processing device 5 is applied to a three-chip LCD projector. The imaging module 52 is used for receiving the first waveband light and the second waveband light (i.e. the incident ray I) from the relay module 51. By the color-separating elements (e.g. dichroic filters) of the imaging module 52, the color lights contained in the incident ray I are separated. In an embodiment, a first dichroic filter 5201 and a second dichroic filter 5202 are employed to separate the three primary color lights. The green light and the red light are permitted to be transmitted through the first dichroic filter 5201, but the blue light is reflected by the first dichroic filter 5201. The red light is permitted to be transmitted through the second dichroic filter 5202, but the green light is reflected by the second dichroic filter 5202. The blue light fraction of the incident ray I is reflected by the first dichroic filter 5201, reflected by the first reflective mirror 5203, and projected on a first liquid crystal display unit 5204. The green light fraction of the incident ray I is transmitted through the first dichroic filter 5201, reflected by the second dichroic filter 5202, and projected on a second liquid crystal display unit 5205. The red light fraction of the incident ray I is transmitted through the first dichroic filter 5201 and the second dichroic filter 5202, reflected by a second reflective mirror 5207 and a third reflective mirror 5208, and projected on a third liquid crystal display unit 5206. Afterwards, the image is projected out from a cross dichroic prim (X-Cube) 5209 to the lens group 6 along the rear end of the optical path.

FIG. 7B schematically illustrates another exemplary imaging module used in the projection apparatus of the present invention. In this embodiment, the imaging module 52 of the image processing device 5 is applied to a two-chip LCD projector. The imaging module 52 also includes a first liquid crystal display unit 5204, a second liquid crystal display unit 5205, and cross dichroic prim 5209. The processes of propagating the incident ray and the blue light fraction are similar to those of FIG. 7A, and are not redundantly described herein. In this embodiment, the phosphor device with plural sections is employed, and thus plural second waveband lights may be time-sequentially directed to the imaging module 52. That is, the green light fraction and the red light fraction of the incident ray are both received by the second liquid crystal display unit 5205, and the green light and the red light are time-sequentially projected on the cross dichroic prim 5209 in a time division manner. The images outputted from the first liquid crystal display unit 5204 and the second liquid crystal display unit 5205 are combined together by the cross dichroic prim 5209, and the combined image is directed to the rear end of the optical path.

Figure 9A:
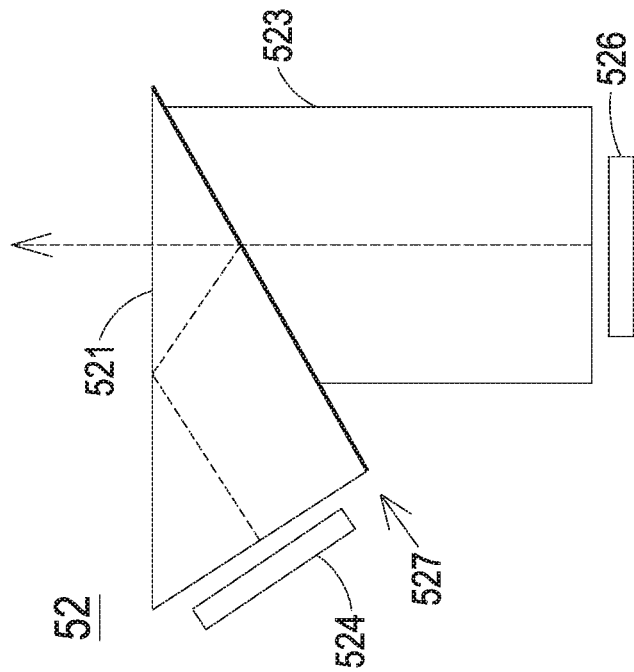
FIG. 9A schematically illustrates another exemplary imaging module used in the projection apparatus of the present invention.

FIG. 9A schematically illustrates another exemplary imaging module used in the projection apparatus of the present invention. Please refer to FIGS. 6A and 9A. In this embodiment, the imaging module 52 of the image processing device 5 is applied to a three-chip digital light processing (DLP) projector. The imaging module 52 includes a first prism 521, a second prism 522, and a third prism 523. The blue light from a first digital micromirror device 524 may be reflected by a first interface 527 between the first prism 521 and the second prism 522. The red light from a second digital micromirror device 525 may be reflected by a second interface 528 between the second prism 522 and the third prism 523. The blue light and the red light are combined with the green light from a third digital micromirror device 526, so that a resultant image is projected out to the rear end of the optical path.

Figure 9B:
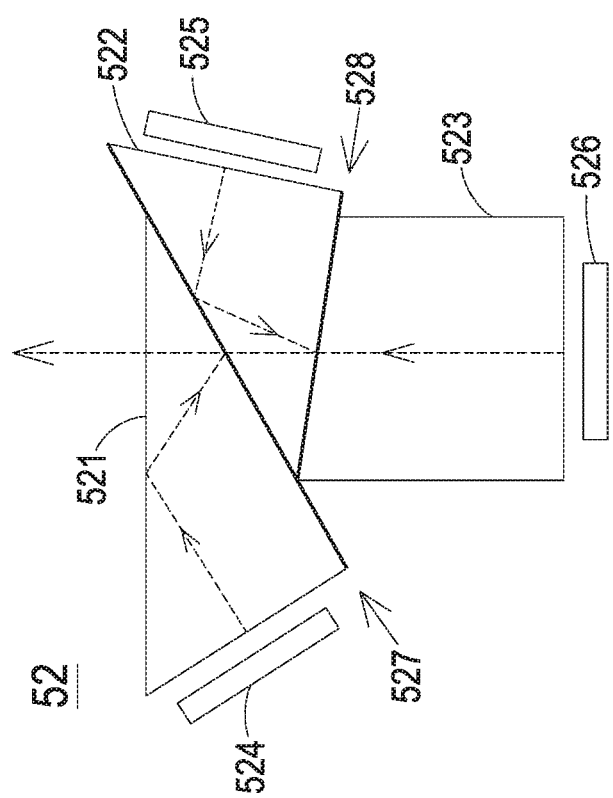
FIG. 9B schematically illustrates another exemplary imaging module used in the projection apparatus of the present invention.

FIG. 9B schematically illustrates another exemplary imaging module used in the projection apparatus of the present invention. In this embodiment, the imaging module 52 of the image processing device 5 is applied to a two-chip digital light processing (DLP) projector. The imaging module 52 includes a first prism 521, a third prism 523, a first digital micromirror device 524, and a third digital micromirror device 526. There is an interface 527 between the first prism 521 and the third prism 523. The processes of propagating the incident ray and the blue light fraction are similar to those of FIG. 8A, and are not redundantly described herein. On the other hand, the third digital micromirror device 526 is used for receiving the green light and the red light. The green light and the red light are time-sequentially reflected to the third prism 523. The green light and the red light are combined with the blue light from the first digital micromirror device 524, so that a resultant image is projected out to the rear end of the optical path.

According to the above discussion, the basic operation of the phosphor device and the illumination system is completely described. Several embodiments will be described as follows for explaining how to increase the output intensity of the phosphor device of a reflective illumination system.

Figure 10A:
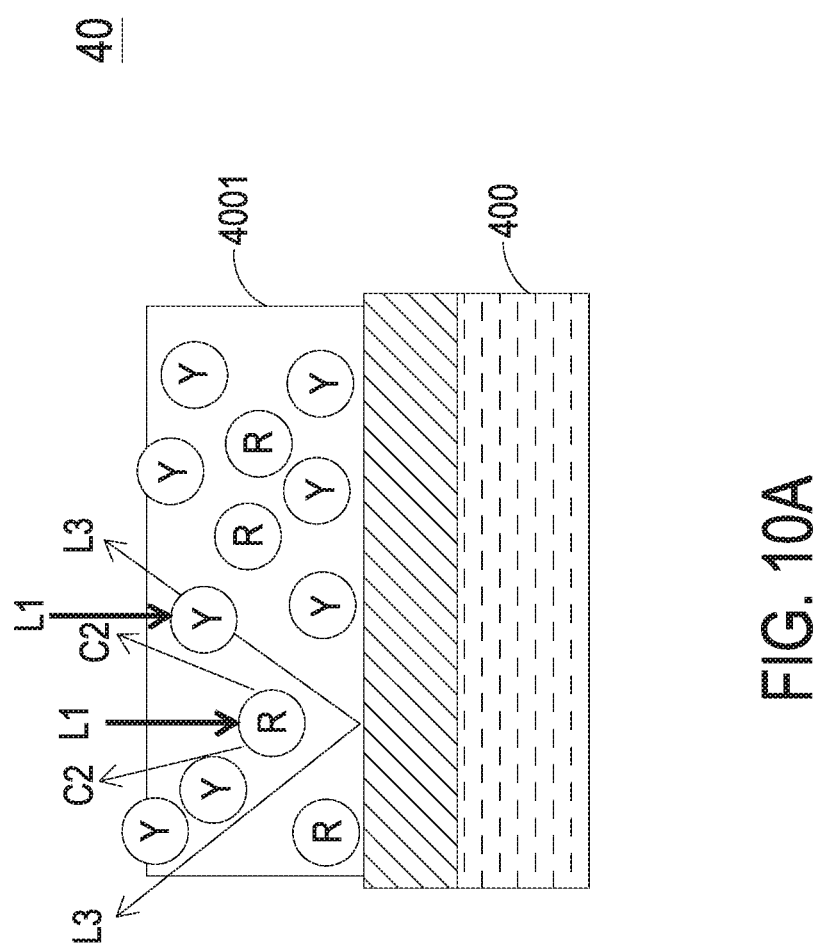
FIG. 10A schematically illustrates the structure of a phosphor device including a reflective substrate according to an embodiment of the present invention.

FIG. 10A schematically illustrates the structure of a phosphor device including a reflective substrate according to an embodiment of the present invention. Please refer to FIG. 7A and FIG. 10A, a phosphor device 40 of the present invention includes a reflective substrate 400 and a first phosphor layer 4001. The reflective substrate 400 has a first section 401. The first phosphor layer 4001 includes a first phosphor agent and a fourth phosphor agent. The first phosphor agent is similar with the first phosphor agent described in the above-mentioned embodiments. However, for clearly showing the first phosphor agent in FIG. 10A and FIG. 10B, the first phosphor agent is shown as "Y", and the fourth phosphor agent is shown as "R" in FIG. 10A and FIG. 10B.

Please refer to FIG. 4, FIG. 7A and FIG. 10A. The first phosphor agent Y is formed on the first section 401. The first waveband light L1 is converted into a third waveband light L3 so as to be directed to the optical path P by the first phosphor agent Y. The range of the spectrum of the third waveband light L3 includes at least a first color light C1 and a second color light C2, so that the second color light C2 is separated from the third waveband light L3 along the optical path P. The fourth phosphor agent R is distributed over the first phosphor agent Y for converting the first waveband light L1 into the second color light C2 so as to increase the luminous intensity of the second color light C2. In addition, the first section 401 has a reflective spectrum with a reflectivity corresponded to the second color light C2 greater than the reflectivity corresponded to the second color light C2 of aluminum.

Figure 10B:
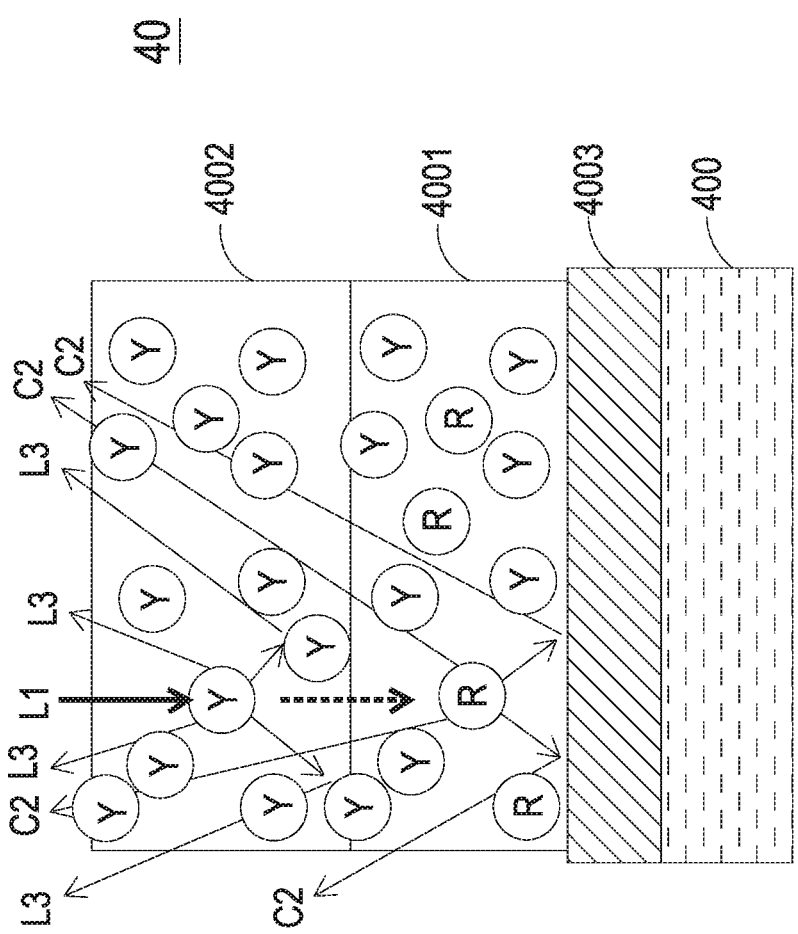
FIG. 10B schematically illustrates the structure of the phosphor device shown in FIG. 10A further including a second phosphor layer.

Please refer to FIG. 10B. FIG. 10B schematically illustrates the structure of the phosphor device shown in FIG. 10A further including a second phosphor layer. The phosphor device 40 further includes a second phosphor layer 4002. The second phosphor layer 4002 is disposed on the first phosphor layer 4001. The second phosphor layer 4001 includes the first phosphor agent Y for converting the first waveband light L1 into the third waveband light L3 and decreasing the energy of the first waveband light L1, but not limited thereto.

In some embodiments, the first waveband light L1 is blue light or ultraviolet light. The wavelength of the third waveband light L3 is between 450 and 710 nanometers. The first color light C1 is green light. The second color light C2 is red light. The first phosphor agent Y is a yellow phosphor agent or a yellow-green phosphor agent. The fourth phosphor agent R is a red phosphor agent. The range of the spectrum of the second color light C2 of the third waveband light L3 is at least partially overlapped with the range of the spectrum of the second color light C2 converted by the fourth phosphor agent R. In addition, the fourth phosphor agent R can be mixed with the first phosphor agent Y as a mixture in a mixing manner.

Figure 11A:
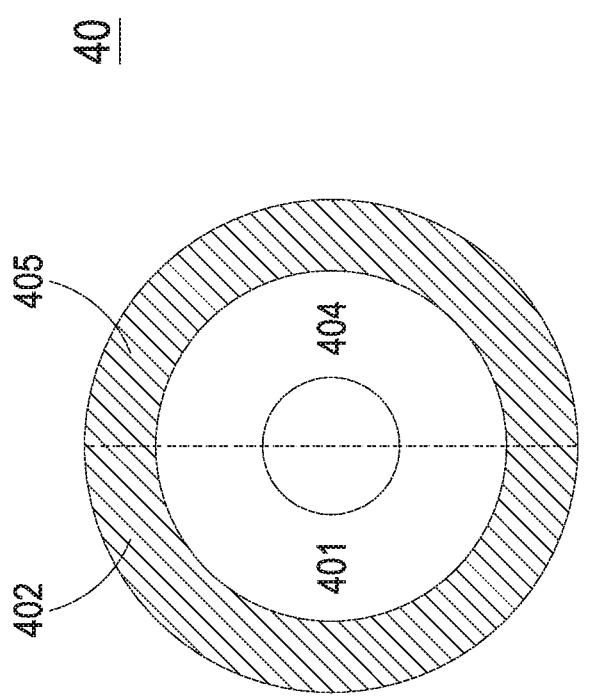
FIG. 11A schematically illustrates the structure of a phosphor device according to an embodiment of the present invention.
Figure 11B:
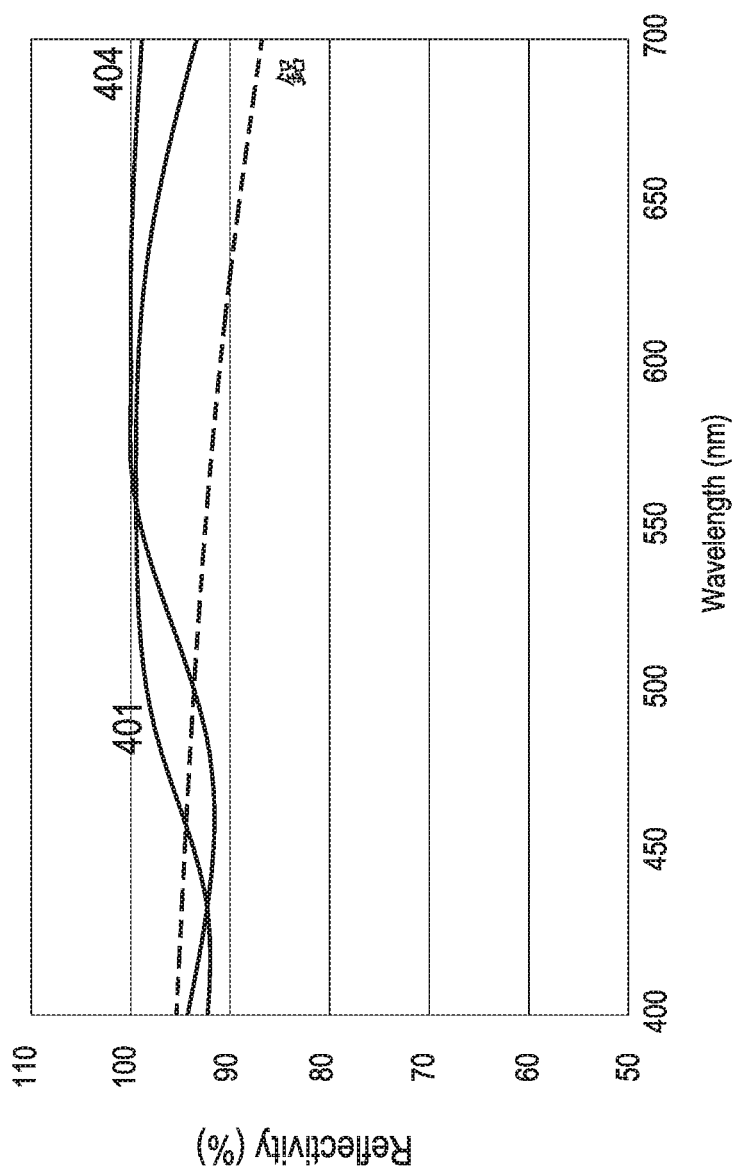
FIG. 11B schematically illustrates the reflective spectra of the first section and the second section shown in FIG. 11A and aluminum.

In some embodiments, the present invention provides a phosphor device including a reflective substrate, which has at least two reflective spectra, so that the reflective spectrum corresponded to a specified color light can be specified for providing the phosphor device has a reflectivity corresponded to all waveband greater than the reflectivity corresponded to all waveband of aluminum, and further the max outputs of each waveband are provided. FIG. 11A schematically illustrates the structure of a phosphor device according to an embodiment of the present invention. FIG. 11B schematically illustrates the reflective spectra of the first section and the second section shown in FIG. 11A and aluminum. Please refer to FIG. 4, FIG. 11A and FIG. 11B, the phosphor device 40 includes a first section 401, a first phosphor agent 402, a second section 404 and a second phosphor agent 405. The first section 401 and the second section 404 are assembled as a reflective substrate. The reflective substrate is a glass substrate, a borosilicate glass substrate, a quartz substrate, a sapphire substrate, a calcium fluoride substrate, a silicon substrate, a silicon carbide substrate, a graphene thermally conductive substrate, an aluminium oxide substrate, a boron nitride substrate, or a substrate containing at least a metal material, wherein the metal material is aluminum, magnesium, copper, silver or nickel, but not limited herein. The first phosphor agent 402 is coated on the first section 401, the second phosphor agent 405 is coated on the second section 404. One of the first section 401 and the second section 404 has a reflective spectrum with a reflectivity corresponded to the first color light C1 greater than the reflectivity corresponded to the first color light C1 of aluminum, and the other one of the first section and the second section has a reflective spectrum with a reflectivity corresponded to the second color light C2 greater than the reflectivity corresponded to the second color light C2 of aluminum. In particular, a metal reflection layer is formed on the first section 401 and the second section 404 of the reflective substrate, and a first dielectric film layer and a second dielectric film layer are reflectively plated on the metal reflection layer corresponded to the first section 401 and the second section 404 so as to adjust the reflective spectrum of the metal reflection layer.

Please refer to FIG. 11B. It illustrates that the performance of reflectivity of the first dielectric film layer is better than the performance of reflectivity of the second dielectric film layer in the range of the spectrum of green light, and the performance of reflectivity of the second dielectric film layer is better than the performance of reflectivity of the first dielectric film layer in the range of the spectrum of red light. Meanwhile, when the first color light C1 is green light and the second color light C2 is red light, obviously the performance of reflectivity of the first section 401 in the range of the spectrum of green light and the performance of reflectivity of the second section 404 in the range of the spectrum of red light are both better than the performances of reflectivity of the first section 401 and the second section 404 only utilized aluminum as the metal reflection layer.

Furthermore, take the excitation of high energy Laser with 209 watts for example. If the first phosphor agent 402 and the second phosphor agent 405 are yellow phosphor agents, the output efficiency of the green light of the first section 401 and the output efficiency of the red light of the second section 404 of the phosphor device 40 of the present invention are respectively enhanced 10.5% and 1.7% compared with the output efficiencies of aluminum metal reflection layer of prior art. On the other hand, if the first phosphor agent 402 is a green phosphor agent and the second phosphor agent 405 is a yellow phosphor agent, the output efficiency of the green light of the first section 401 and the output efficiency of the red light of the second section 404 of the phosphor device 40 of the present invention are respectively enhanced 9.3% and 2.9% compared with the output efficiencies of aluminum metal reflection layer of prior art.

Figure 12A:
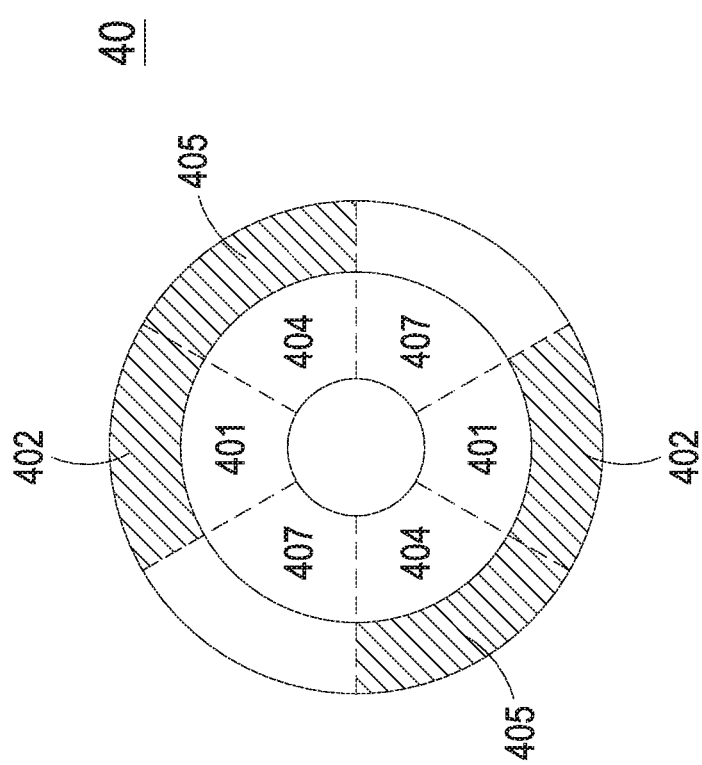
FIG. 12A schematically illustrates the structure of a phosphor device according to another embodiment of the present invention.
Figure 12B:
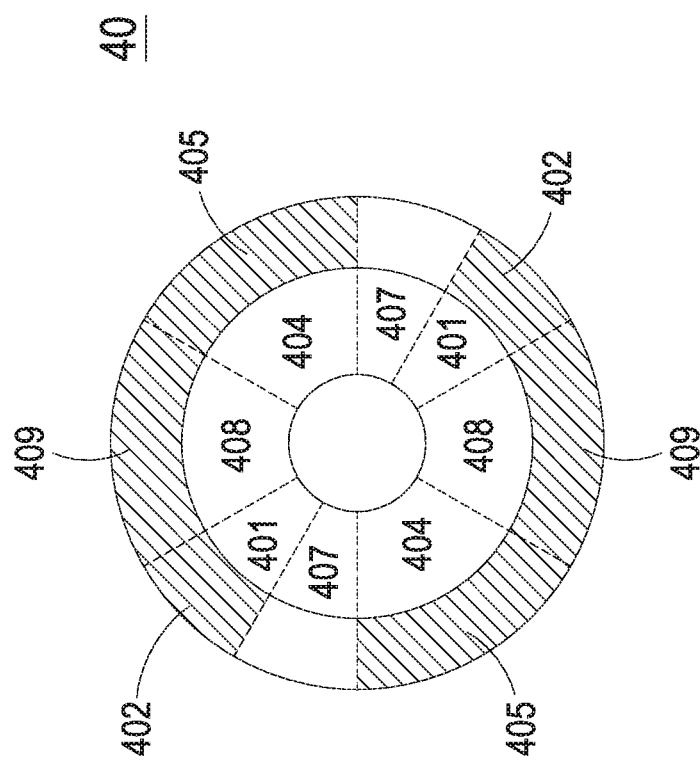
FIG. 12B schematically illustrates the structure of a phosphor device according to still another embodiment of the present invention.

FIG. 12A schematically illustrates the structure of a phosphor device according to another embodiment of the present invention. FIG. 12B schematically illustrates the structure of a phosphor device according to still another embodiment of the present invention. Please refer to FIG. 4, and FIG. 12A and FIG. 12B, the phosphor device 40 of the present invention further includes a third section 407 besides the first section 401, the first phosphor agent 402, the second section 404 and the second phosphor agent 405 mentioned above. The third section 407 is a reflective section or a transparent section for directly reflecting the first waveband light L1 or for the first waveband light L1 to be transmitted through. For example, the transparent section is a hollow structure or a glass plate coated with an optical film that the first waveband light L1 is capable to pass through. In some embodiments, the first phosphor agent 402 and the second phosphor agent 405 have identical or different compositions, the first phosphor agent 402 is a yellow phosphor agent or a yellow-green phosphor agent, and the second phosphor agent 405 is a yellow phosphor agent or a yellow-green phosphor agent. In addition, the phosphor device 40 of the present invention further includes a fourth section 408 and a third phosphor agent 409. The third phosphor agent 409 is coated on the fourth section 408. In some embodiments, any two of the first phosphor agent 402, the second phosphor agent 405 and the third phosphor agent 409 are similar with each other or are distinct from each other. The first phosphor agent 402 is a yellow phosphor agent or a yellow-green phosphor agent, the second phosphor agent 405 is a yellow phosphor agent or a yellow-green phosphor agent, and the third phosphor agent 409 is a yellow phosphor agent or a yellow-green phosphor agent.

In some embodiments, the first phosphor agent 402 is a yellow phosphor agent or a yellow-green phosphor agent, and the second phosphor agent 405 is a red phosphor agent or a green phosphor agent, but not limited herein. Additionally, the phosphor device 40 of the present invention may include a fourth section 408 and a third phosphor agent 409. The third phosphor agent 409 is coated on the fourth section 408. The first phosphor agent 402 and the third phosphor agent 409 have identical or different compositions, and the third phosphor agent 409 is a yellow phosphor agent or a yellow-green phosphor agent.

In other words, the phosphor device 40 of the present invention can be regarded as including a reflective substrate, a first phosphor agent 402 and a second phosphor agent 405. The first section 401 of the reflective substrate has a reflective spectrum with a reflectivity corresponded to the first color light C1 greater than the reflectivity corresponded to the first color light C1 of aluminum. The second section 404 has a reflective spectrum with a reflectivity corresponded to the second color light C2 greater than the reflectivity corresponded to the second color light C2 of aluminum. The third section 407 directly reflects the first waveband light L1, or the first waveband light L1 is directly transmitted through the third section 407. The spectrum of the first section 401, the spectrum of the second section 404 and the spectrum of the third section 407 are different.

Moreover, the first phosphor agent 402 is coated on the first section 401 for converting the first waveband light L1 into a third waveband light L3. The range of the spectrum of the third waveband light L3 at least includes the first color light C1. The second phosphor agent 405 is coated on the second section 404 for converting the first waveband light L1 into a third waveband light L3. The range of the spectrum of the third waveband light L3 at least includes the second color light C2. A metal reflection layer is simultaneously formed on the first section 401, the second section 404 and the third section 407 of the reflective substrate. The metal reflection layer is an aluminum reflection layer or a silver reflection layer. The first section 401 includes at least a first dielectric film layer, the second section 404 includes at least a second dielectric film layer, and the first dielectric film layer and the second dielectric film layer are plated on the metal reflection layer for adjusting the reflective spectrum of the metal reflection layer.

In some embodiments, the first color light C1 is green light, the second color light C2 is red light, the first waveband light L1 is blue light or ultraviolet light, the third waveband light L3 is green light or yellow light, the third waveband light L3 is red light or yellow light, the first phosphor agent 402 is a green phosphor agent, a yellow phosphor agent or a yellow-green phosphor agent, and the second phosphor agent 405 is a red phosphor agent, a yellow phosphor agent or a yellow-green phosphor agent.

In some embodiments, the phosphor device 40 of the present invention further includes a third phosphor agent 409. The reflective substrate further includes a fourth section 408. The third phosphor agent 409 is coated on the fourth section 408 for converting the first waveband light L1 into a fourth waveband light L4. The range of the spectrum of the fourth waveband light L4 at least includes the first color light C1 and the second color light C2. Particularly, the fourth waveband light L4 is yellow light, the third phosphor agent 409 is a yellow phosphor agent or a yellow-green phosphor agent, the fourth section 408 has a reflective spectrum with a reflectivity corresponded to yellow light greater than the reflectivity corresponded to yellow light of aluminum, and the spectrum of the first section 401, the spectrum of the second section 404, the spectrum of the third section 407 and the spectrum of the fourth section 408 are different.

From the above descriptions, the present invention provides a phosphor device. By utilizing the first phosphor agent to convert the first waveband light into a second waveband light with a wider waveband to the optical path, and separate the second waveband light along the optical path to select the first color light or the second color light for meeting the practical demands, the diversity of the design of the phosphor device is enhanced, the manufacturing cost and the size of product are reduced, and the color purity is enhanced. Meanwhile, since the reflective substrate has at least two reflective spectra, the reflective spectrum corresponded to a specified color light can be specified for providing the phosphor device has a reflectivity corresponded to all waveband greater than the reflectivity corresponded to all waveband of aluminum, and further the max outputs of each waveband are provided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection apparatus comprising:
   an illumination system, comprising:
   a first solid-state light-emitting element emitting a first waveband light;
   a second solid-state light-emitting element emitting a second waveband light; and
   a phosphor wheel, having:
   a first section and a second section containing a first phosphor agent and a second phosphor agent, wherein the first phosphor agent is coated on the first section, the second phosphor agent is coated on the second section, so that the first waveband light is received by the phosphor wheel and converted into a third waveband light, which is directed to an optical path,
   wherein compositions of the first phosphor agent and the second phosphor agent are identical or different, so that the first waveband light is converted into one kind of the third waveband light or two kinds of the third waveband light; and
   a dichroic element introducing the second waveband light and the third waveband light into the optical path; and
   an image processing device configured to receive the second waveband light and the third waveband light and separate the third waveband light into a first light and a second light,
   wherein the first waveband light and the second waveband light are lights within different wavebands, and a waveband of the third waveband light is wider than a waveband of the first waveband light.

2. The projection apparatus according to claim 1, wherein the first phosphor agent and the second phosphor agent are yellow phosphor agents, green phosphor agents or yellow-green phosphor agents, so that the range of the waveband of the third waveband light converted from the first waveband light is between 450 nm and 710 nm.

3. The projection apparatus according to claim 2, wherein the second waveband light is directly emitted to the dichroic element, when the compositions of the first phosphor agent and the second phosphor agent are identical, the first light and the second light separated by the image processing device are formed as at least two color lights and projected with the second waveband light as an image in a color separation manner.

4. The projection apparatus according to claim 2, wherein the second waveband light is directly emitted to the dichroic element, when the compositions of the first phosphor agent and the second phosphor agent are different, the two kinds of the third waveband light are separated into the first light and the second light by the image processing device in a time division manner.

5. The projection apparatus according to claim 1, wherein the phosphor wheel comprises a transparent section, and the first waveband light is transmitted through the transparent section and directed to a rear end of the optical path.

6. The projection apparatus according to claim 5, wherein the rear end of the optical path includes the image processing device and a lens group.

7. The projection apparatus according to claim 5, wherein the phosphor wheel has plural sections, and a filter is used to adjust the luminance and brightness of a specified waveband light.

8. A projection apparatus comprising:
   an illumination system, comprising:
   a first solid-state light-emitting element emitting a first waveband light;
   a second solid-state light-emitting element emitting a second waveband light;
   a phosphor wheel, having:
   a first section and a second section containing a first phosphor agent and a second phosphor agent, wherein the first phosphor agent is coated on the first section, the second phosphor agent is coated on the second section, so that the first waveband light is received by the phosphor wheel and converted into a third waveband light, which is directed to an optical path,
   wherein the first phosphor agent and the second phosphor agent are yellow phosphor agents, green phosphor agents or yellow-green phosphor agents,
   wherein compositions of the first phosphor agent and the second phosphor agent are different, so that the first waveband light is converted into two kinds of the third waveband light;
   a dichroic element introducing the second waveband light and the third waveband light into the optical path; and
   a first color filter and a second color filter configured to filter the two kinds of the third waveband light, so that a first light and a second light are separated and emitted to the optical path,
   wherein the first waveband light and the second waveband light are lights within different wavebands, and wavebands of the two kinds of the third waveband light are wider than a waveband of the first waveband light.

9. A projection apparatus comprising:
   an illumination system, comprising:
   a first solid-state light-emitting element emitting a first waveband light;
   a second solid-state light-emitting element emitting a second waveband light; and
   a phosphor wheel, having:
   a first section containing a phosphor agent, wherein the phosphor agent is coated on the first section, so that the first waveband light is received by the phosphor agent and converted into a third waveband light, which is directed to an optical path; and
   a dichroic element introducing the second waveband light and the third waveband light into the optical path, wherein the second waveband light and the third waveband light are integrated as an equivalent white light; and
   an image processing device configured to receive the equivalent white light and separate the equivalent white light into three primary color lights that are projected as an image,
   wherein a waveband of the third waveband light is wider than a waveband of the first waveband light, and the equivalent white light covers a red waveband, a green waveband and a blue waveband.

10. A projection apparatus comprising:
    an illumination system, comprising:
    a first solid-state light-emitting element emitting a first waveband light;
    a second solid-state light-emitting element emitting a second waveband light; and
    a phosphor wheel, having:

a first section containing a phosphor agent, wherein the phosphor agent is coated on the first section, so that the first waveband light is received by the phosphor agent and converted into a third waveband light, wherein the phosphor agent is a yellow phosphor agent, a green phosphor agent or a yellow-green phosphor agent; and a color filter disposed adjacent to the first section of the phosphor wheel for separating the third waveband light into a first light and a second light, and emitting one of the first light and the second light to the optical path, wherein the first waveband light and the second waveband light are lights within different wavebands, and a waveband of the third waveband light is wider than a waveband of the first waveband light.

* * * * *